No. 775,754. PATENTED NOV. 22, 1904.
H. H. KELLY.
APPARATUS FOR THRESHING AND CLEANING SEED COTTON.
APPLICATION FILED FEB. 24, 1904.
NO MODEL. 2 SHEETS—SHEET 1.
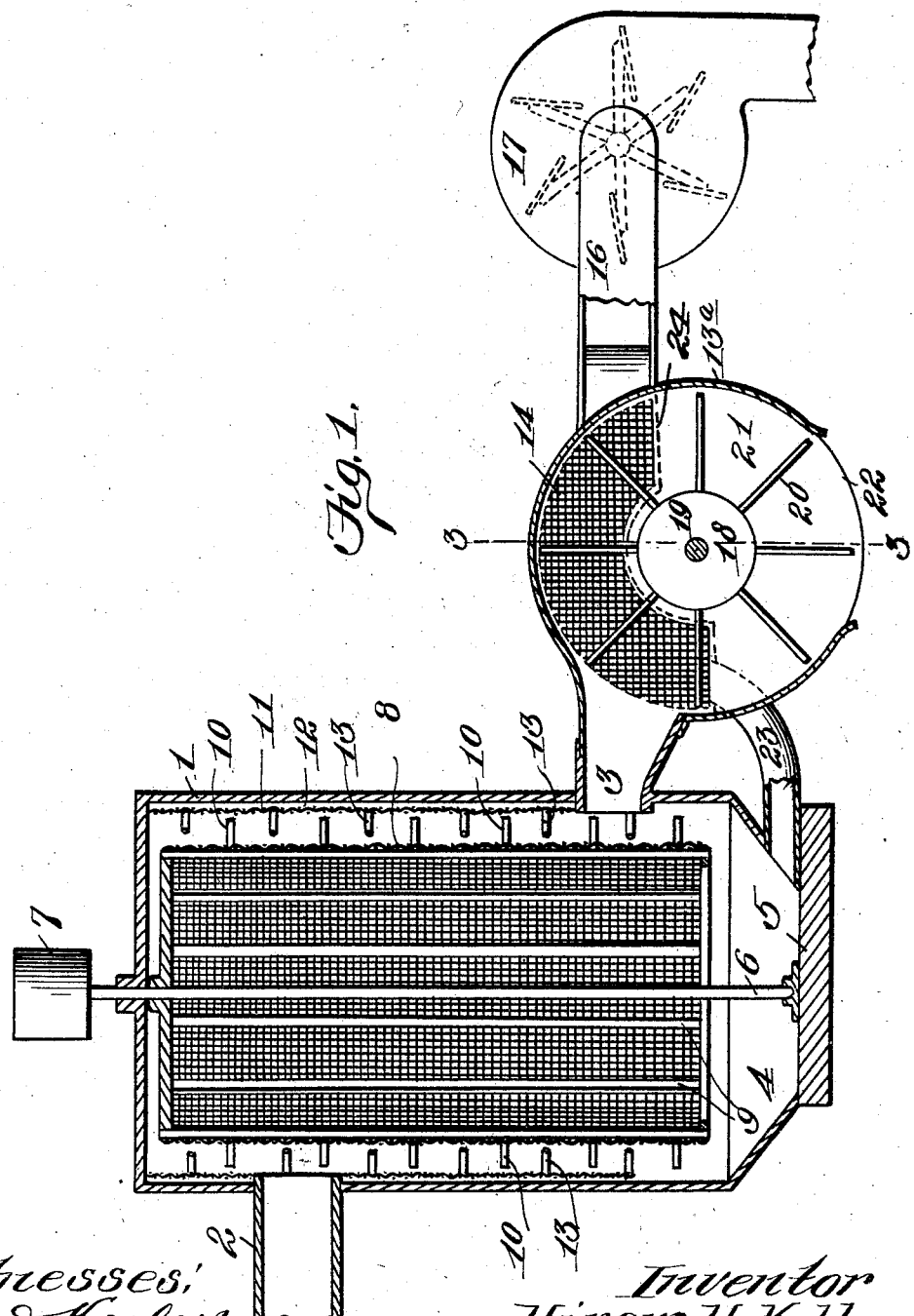
Witnesses:
Inventor
Hiram H. Kelly

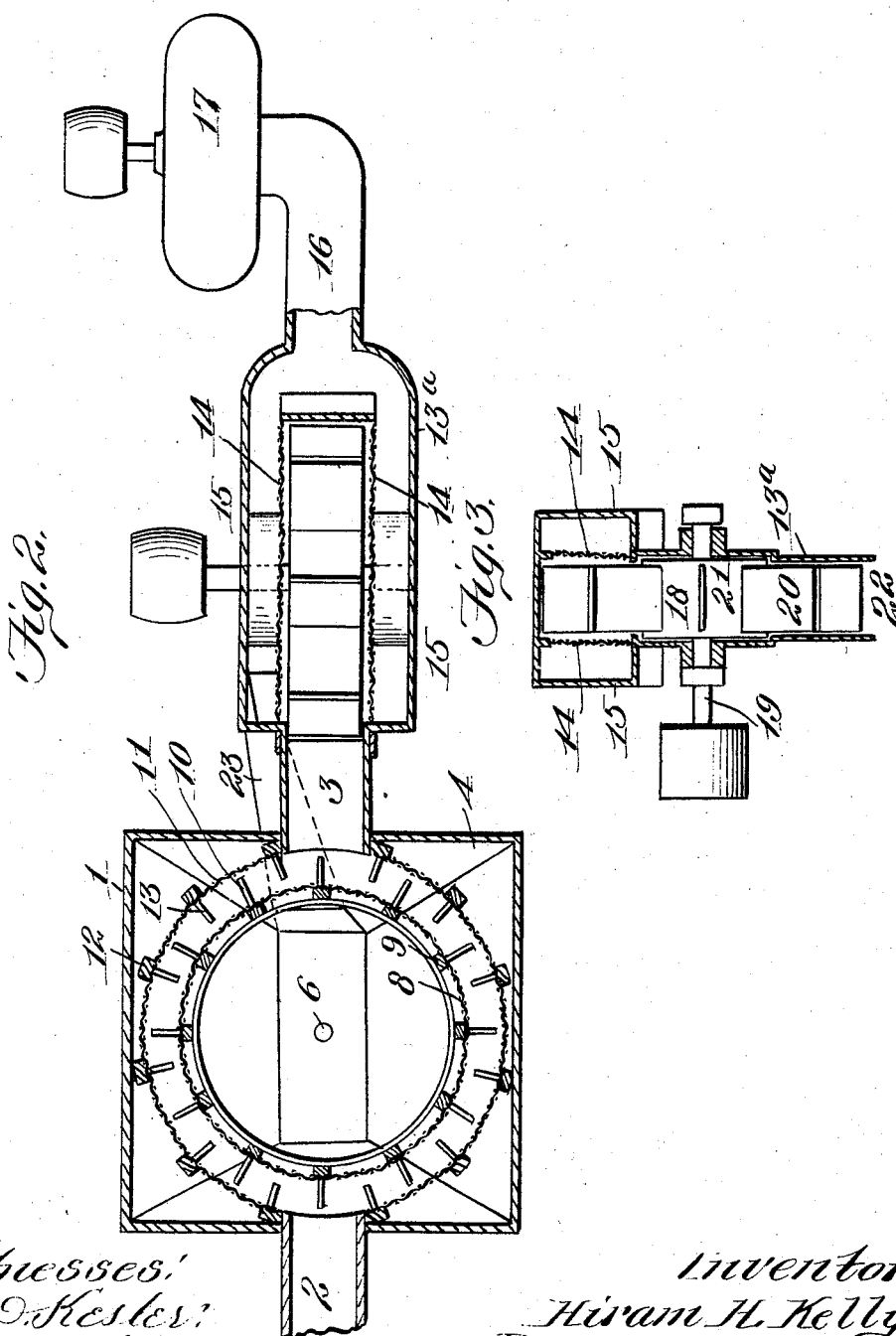

No. 775,754. Patented November 22, 1904.

UNITED STATES PATENT OFFICE.

HIRAM H. KELLY, OF CRANDALL, TEXAS.

APPARATUS FOR THRESHING AND CLEANING SEED-COTTON.

SPECIFICATION forming part of Letters Patent No. 775,754, dated November 22, 1904.

Application filed February 24, 1904. Serial No. 195,067. (No model.)

*To all whom it may concern:*

Be it known that I, HIRAM H. KELLY, a citizen of the United States, residing at Crandall, in the county of Kaufman and State of Texas, have invented new and useful Improvements in Apparatus for Threshing and Cleaning Seed-Cotton, of which the following is a specification.

This invention relates to a novel apparatus for threshing and cleaning seed-cotton, and has for its object to provide a device into which the cotton-bolls are fed, partly mechanically and partly by suction, the bolls being broken up and the cotton drawn out and the dirt and trash separated therefrom, the cotton being thus prepared for treatment in the ordinary huller-gin.

The invention further has to do with certain novel constructions, combinations, and operations of parts hereinafter specified whereby the general operation above outlined is carried out.

That which I claim as new will be indicated in the claims following the specification.

The invention is illustrated in the accompanying drawings, in which—

Figure 1 is a sectional side elevation of a machine constructed according to my invention. Fig. 2 is a sectional plan view of the same, and Fig. 3 is a transverse section on the line 3 3 of Fig. 1.

Referring now to the drawings, 1 indicates a casing, shown to be rectangular in form, provided at one side near its upper end with an inlet-pipe 2 for seed and bolled cotton at the opposite side near the bottom with an outlet 3 and at its bottom with a hopper 4. The casing 1 is shown to be mounted upon a base-block 5. Mounted upon this base-block in a suitable bearing at its lower end is a shaft 6, which projects through and is suitably journaled in the top of the casing 1 and is provided with a pulley 7 or other suitable means, whereby it may be rotated. Mounted upon the shaft 6 to rotate therewith is a cylinder 8, the wall of which is formed of suitable foraminous material, such as wire-gauze. The wire-gauze is supported by means of bars 9, arranged at intervals throughout the circumference of the cylinder 8, and each spider is provided with a row of outwardly-projecting picker-fingers 10, said rows of picker-fingers extending from the top to the bottom of the cylinder 8. Surrounding the cylinder 8 at a suitable distance therefrom is a similar cylinder 11, formed of foraminous material, such as wire-gauze, supported upon bars 12, and each bar 12 is provided with a row of inwardly-projecting fingers 13, which extend inwardly between the picker-fingers 10 of the cylinder 8. The bottoms of the cylinders 8 and 11 are open, so as to permit trash and dirt to fall into the hopper 4.

The inlet-pipe 2, above referred to, extends through the wall of the casing 1 and through the wall of the cylinder 11, so as to communicate with the interior of the latter. The outlet-pipe 3 also extends through the wall of the casing 1 and through the wall of the cylinder 11 to communicate with the interior of the latter. The outlet-pipe 3 communicates with a machine for separating the air from the cotton. This machine comprises a casing $13^a$, a segment of each side wall of which is formed of foraminous material, such as wire-gauze 14 14, and on the outer side of said casing $13^a$ are inclosed segmental chambers 15, the inner side of each of which is formed by the foraminous material 14. These chambers, as shown, extend approximately about the upper half of the casing $13^a$. Communicating with the chambers 15 on the side of the casing opposite to that at which the spout 3 is located is a spout 16, which communicates with a fan-casing 17. In the casing $13^a$ is journaled a paddle-wheel 18, which may revolve in any suitable manner from its shaft 19. Between each two blades 20 of the paddle-wheel is formed a pocket 21 for the reception of the cotton-seeds and cotton. The lower side of the casing $13^a$ is provided with an opening 22, through which the cotton is discharged from the pockets 21. Extending from the hopper 4 is a suction-pipe 23, which communicates with the chambers 15.

The operation of the device as thus far described is as follows: The cotton-bolls are fed in through the pipe 2, the feeding being facilitated by the suction produced in the machine by the fan 17 and also by the engagement of the picker-fingers 10 with the cotton-bolls. As the cylinder 8 revolves these bolls are drawn by the picker-fingers 10 between the fingers 13 and over the foraminous surfaces of the two cylinders 8 and 11, so that the cotton-bolls are thoroughly disintegrated and the cotton loosened and drawn out. While this is being effected the suction-pipe 23 is drawing air from within the cylinder 8 and from the outside of the stationary cylinder 11, while through the pipe 3 air is drawn from the inside of the cylinder 11 and the outside of the cylinder 8. All dirt or trash passing through the meshes of the cylinders or falling from between them drops into the hopper 4 and is carried away from the suction-pipe 23, the chambers 15, the pipe 16, to the fan-casing 17, whence it is discharged.

In the operation of the apparatus as the cotton reaches the outlet-pipe 3 it is drawn by suction therethrough into respective pockets 21, the suction being exerted from the chambers 15 through the wire-cloth walls 14. It will be seen, therefore, that while this suction draws the cotton into the respective pockets 21 the wire-cloth walls 14 will prevent the cotton from being drawn along by the suction of the fan, the paddle-wheel 18 revolving with its blades in close proximity to the foraminous walls 14, as will be understood. Hence as the said paddle-wheel revolves it will continually receive in the pockets 21 a quantity of threshed cotton from the spout 3, and as the pockets 21 pass beyond the outer end of the chambers 15, said end being indicated by 24, all suction on the cotton ceases, and hence as the pockets come opposite the opening 22 in the casing 13ª the cotton will be discharged. Thus a complete separation between the current of air induced by the fan 17 and the cotton to be discharged is effected.

The machine above described thus serves to thoroughly break up or thresh the cotton-bolls and loosen or draw out cotton, while at the same time separating a great deal of the dirt and trash therefrom, such as the hulls of the bolls, and the cotton may be presented to the gin in a condition to be readily operated upon in the known manner of operation of such machines.

Having thus fully described my invention, what I claim as new, and desire to secure by Letters Patent of the United States, is—

1. In combination with a machine for threshing cotton, a suction device for withdrawing the cotton from said machine, a casing interposed between the said suction device and the machine and communicating with the latter and having an outlet, a carrier mounted in said casing, a chamber provided on either side of said casing and communicating with said suction device and provided with foraminous sides adjacent to said carrier, and a suction pipe leading from the bottom of said casing and affording communication between said machine and one of said chambers.

2. In a seed-cotton thresher and cleaner, the combination with a casing, of an inner revolving and an outer stationary cylinder, both of foraminous material, mounted therein and provided, respectively, with oppositely-directed coacting fingers, an inlet-pipe leading to, and an outlet-pipe leading from said outer cylinder, a suction device for withdrawing the cotton from said casing, a refuse-pipe leading from the bottom of said casing and communicating with said suction device, and means interposed between said casing and said suction device for preventing the cotton from following the course of the air-current and for discharging the cotton from the apparatus.

3. In a seed-cotton thresher and cleaner, the combination with a casing, of an inner revolving and an outer stationary cylinder, both of foraminous material, mounted therein and provided, respectively, with oppositely-directed coacting fingers, an inlet-pipe leading to, and an outlet-pipe leading from said outer cylinder, a refuse-pipe leading from said casing, and a suction device for simultaneously withdrawing the cotton from said casing and the refuse through said pipe.

4. In a seed-cotton thresher and cleaner, the combination with a casing, of an inner revolving and an outer stationary cylinder, both of foraminous material, mounted therein and provided, respectively, with oppositely-directed coacting fingers, an inlet-pipe leading to, and an outlet-pipe leading from said outer cylinder, and means including a suction device for withdrawing the cotton, and the dirt and trash from said casing by different paths.

5. In a seed-cotton thresher and cleaner, the combination with a casing provided with a hopper in its bottom, of an inner revolving and an outer stationary cylinder, both of foraminous material, mounted therein and provided, respectively, with oppositely-directed coacting fingers, an inlet-pipe leading to, and an outlet-pipe leading from said outer cylinder, a suction-pipe leading from said hopper and a suction device for withdrawing the cotton from said outlet and the dirt and trash through said suction-pipe.

In testimony whereof I have hereunto set my hand in presence of two subscribing witnesses.

HIRAM H. KELLY.

Witnesses:
J. D. BOYKIN,
E. T. THOMAS.